(12) United States Patent
Stolzenburg et al.

(10) Patent No.: US 9,147,991 B2
(45) Date of Patent: Sep. 29, 2015

(54) SOLID-STATE LASER SYSTEM

(71) Applicant: TRUMPF Laser GmbH, Schramberg (DE)

(72) Inventors: Christian Stolzenburg, Rottweil (DE); Vincent Kuhn, Hausach (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 14/314,179

(22) Filed: Jun. 25, 2014

(65) Prior Publication Data

US 2014/0376581 A1 Dec. 25, 2014

(30) Foreign Application Priority Data

Jun. 25, 2013 (DE) .................. 10 2013 211 977

(51) Int. Cl.
*H01S 3/04* (2006.01)
*H01S 3/16* (2006.01)
*H01S 3/042* (2006.01)
*H01S 3/06* (2006.01)
*B23K 26/00* (2014.01)
*B23K 26/20* (2014.01)
*H01S 3/02* (2006.01)

(52) U.S. Cl.
CPC ........... *H01S 3/0405* (2013.01); *B23K 26/0063* (2013.01); *B23K 26/20* (2013.01); *H01S 3/04* (2013.01); *H01S 3/042* (2013.01); *H01S 3/0604* (2013.01); *H01S 3/16* (2013.01); *H01S 3/025* (2013.01); *H01S 2301/02* (2013.01)

(58) Field of Classification Search
CPC ......... H01S 3/0405; H01S 3/04; H01S 3/042; H01S 3/16
USPC ................................. 372/36, 34, 41
See application file for complete search history.

(56) References Cited

U.S. PATENT DOCUMENTS

| 8,270,440 | B2 * | 9/2012 | Mizuuchi et al. | 372/6 |
| 2005/0074040 | A1 | 4/2005 | Spence et al. | |
| 2008/0298407 | A1 * | 12/2008 | Ikesue | 372/41 |
| 2009/0092162 | A1 * | 4/2009 | Huff et al. | 372/36 |
| 2012/0077003 | A1 * | 3/2012 | Hu | 428/213 |
| 2013/0039378 | A1 | 2/2013 | Zhu et al. | |

FOREIGN PATENT DOCUMENTS

EP 2475054 A1 7/2012

* cited by examiner

*Primary Examiner* — Kinam Park
(74) *Attorney, Agent, or Firm* — Fish & Richardson P.C.

(57) ABSTRACT

A laser system includes a laser-active solid and a heat sink. The heat sink is thermally coupled with the laser-active solid. The laser-active solid and the heat sink are joined together by at least one of direct bonding or laser welded with one another via at least one weld location.

22 Claims, 1 Drawing Sheet

SOLID-STATE LASER SYSTEM

CROSS REFERENCE TO RELATED APPLICATION

This application claims priority under 35 U.S.C. §119 to German Application No. DE 10 2013 211 977.1 filed on Jun. 25, 2013. The content of this priority application is hereby incorporated by reference in its entirety.

TECHNICAL FIELD

The present invention relates to a laser system having a laser-active solid, in particular a laser disk, and having a heat sink which is thermally coupled with the solid.

BACKGROUND

Solid-state laser systems are typically used in laser resonators for generating laser radiation. The laser-active solid (laser crystal, laser disk) is thereby optically excited by means of a pumping light source in order to generate a population inversion in the laser-active solid material.

Various measures are known for fixing the solid to the heat sink. The solid can be attached to the heat sink by, for example, adhesive bonding, soldering or by mounting with indium. A common feature of these known measures is that a filler material (for example the adhesive, the solder or the indium) remains between the solid and the heat sink. However, the use of a filler material leads to an additional thermal resistance and thus to an additional temperature difference between the contact faces of the heat sink and of the solid. Moreover, such filler materials can be damaged, for example, by the (pumped) laser radiation. If the solder is deformed or the adhesive evaporates, for example, this can lead to disadvantageous changes in the laser system. Other techniques for fixing solids to heat sinks generally require joining temperatures which can compromise the functional efficiency of coatings, in particular of reflective coatings, on the solid.

The maximum possible gain of the laser-active solid is influenced by the so-called amplified spontaneous emission (ASE), which is also referred to as superluminescence. The term ASE refers to the (unwanted) amplification within the pumped laser volume of radiation (i.e. photons) generated by spontaneous emissions in the laser-active solid, which propagates inter alia in the lateral direction. If this radiation is not coupled out of the laser-active solid to a sufficient extent, the excitation of unwanted laser modes in the solid may occur. Such laser mode(s) resulting from amplified spontaneous emission constitute a parasitic transverse radiation, which has negative consequences for the laser process. These negative effects include, for example, overheating of the solid, as a result of which the maximum achievable laser power is reduced. There can also be thermo-mechanical damage to the solid. The latter occurs, for example, as burn-offs, particle flaking or melting of the solid material.

SUMMARY

Described below are systems, devices and methods for arranging a laser-active solid and a heat sink in a laser system.

One aspect of the invention features a laser system in which a laser-active solid and a heat sink are joined together by direct bonding and/or are laser welded with one another via at least one weld point. The heat sink is thermally coupled with the solid.

By fixing the laser-active solid to the heat sink with direct bonding, no filler material, such as, for example, adhesive, solder, etc., is present between the joined parts (solid and heat sink) and therefore no additional temperature jump caused by filler material can occur during operation. Other disadvantages potentially caused by filler material, such as, for example, evaporation of adhesive, deformation of solder by absorption of the laser radiation and deformations of the laser-active body induced thereby, may be avoided. The absence of a temperature jump may lead to a smaller temperature increase of the laser-active body and accordingly to improved laser efficiency.

For direct bonding of the solid with the heat sink, the solid and the heat sink may be placed together via contact faces, so that direct atomic contact is established. The contact faces can be flat or curved. A curved contact face of the solid, for example, can be compensated for by a curved contact face of the heat sink. In order for direct atomic contact to be established, a corresponding surface roughness of the contact faces of not more than 1 nm is required. In direct bonding, van-der-Waals bonds typically form between the two join partners, e.g., the solid and the heat sink. The van-der-Waals bonds can be further increased by subsequent heat treatment. The solid is preferably formed of a crystalline, ceramic or amorphous laser material, and the heat sink is preferably formed of diamond, boron nitride, silicon, silicon carbide (SiC), ceramic, metal, metal-diamond composite, metal-boron nitride composite or silicon-diamond composite.

Alternatively or in addition to direct bonding, in order that the direct bond does not come apart under load, the solid and the heat sink can be laser welded to one another.

In the case where the laser-active solid or the heat sink is a component that is transparent to laser welding radiation, the solid and the heat sink are particularly preferably laser welded with one another via at least one weld location through the transparent component by means of ultrashort pulses (USP laser pulses). The at least one weld location is preferably arranged outside a pumping region of the solid which is pumped during laser operation and can be in the form of, for example, a closed weld ring which is arranged around the pumping region of the solid. Alternatively, it is also possible to provide a plurality of point-like weld locations which are arranged along a closed contour, for example a ring, around the pumping region of the solid.

In a particularly preferred embodiment, the laser-active solid has on the inside a plurality of weld filaments which are introduced or melted into the laser-active body by laser welding radiation. These weld filaments are weld seams or structures with melted or re-melted solid material which have a different refractive index as compared to the remainder of the solid material and can act as scatter barriers for amplified spontaneous emission (ASE). The amplified spontaneous emissions are scattered diffusely at these barriers, so that most ASE radiation is coupled out of the laser-active region and the back-reflected portion is not superposed or is superposed in only a small proportion. The negative effects of amplified spontaneous emission can accordingly be prevented wholly or at least partially, so that the output power of the solid-state laser system is increased further. The weld filaments can preferably extend in the thickness direction of the solid over its entire thickness and are advantageously arranged outside a pumping region of the solid which is pumped during laser operation. The weld filaments are preferably distributed evenly in the volume of the solid material and can, for example, be arranged annularly around the pumping region of the solid.

Most particularly preferably, the weld filaments each terminate in a weld location formed between the solid and the heat sink. In this case, the weld locations and the weld filaments can be produced by means of the same laser, by first directing the focus of the laser beam onto the contact plane between the solid and the heat sink, in order to produce the weld location, and then moving it towards the upper side of the solid in order to produce the weld filaments. It will be appreciated that, by appropriate adjustment of the laser parameters (for example the pulse duration of the laser beam), weld filaments terminating at the weld locations can likewise be produced without moving the focused laser beam. The weld filaments can be produced in the solid by equalisation of a self-focusing and diffraction of the laser beam. It is advantageous in this connection, in order to achieve a specific threshold intensity, to choose comparatively short pulse durations (e.g. in the femtosecond range).

Further advantages of the invention will become apparent from the claims, the description and the drawing. The features mentioned above and those listed below can likewise be used individually or a plurality can be used in arbitrary combinations. The embodiments shown and described are not to be understood as being an exhaustive list; on the contrary, they are of an exemplary nature for illustrating the invention.

DESCRIPTION OF DRAWINGS

In the following description of the drawings, identical reference numerals are used for components which are the same or have the same function.

DETAILED DESCRIPTION

Figure 1:
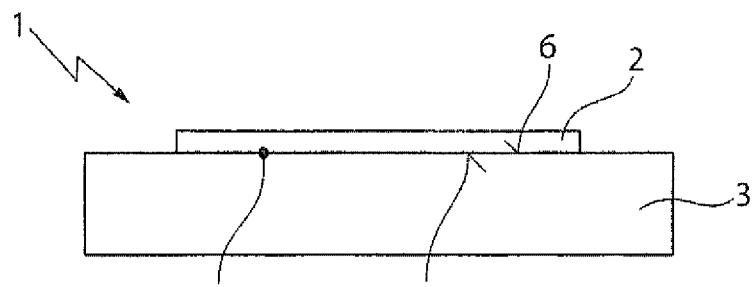
FIG. 1 shows a cross-sectional view of a laser system according to the invention having a laser-active solid fixed to a heat sink by direct bonding.

The laser system 1 shown in FIG. 1 comprises a laser-active solid 2 in the form of a laser disk, for example, and a heat sink 3 which is thermally coupled with the solid 2. The solid 2 and the heat sink 3 typically have a plate-like, in particular disk-like, shape.

The solid 2 and the heat sink 3 are joined together by direct bonding, so that no adhesive, solder or other filler materials are present between the solid 2 and the heat sink 3 for fixing the solid 2 to the heat sink 3. Owing to the direct bonding, a solid contact face 5 and a heat sink contact face 6 are in direct atomic contact with one another (for example by way of van-der-Waals bonds) in a contact plane 4. As a result of this direct contact between the solid 2 and the heat sink 3, heat from the solid 2 is dissipated to the heat sink 3 in the optimum manner.

Figure 2:
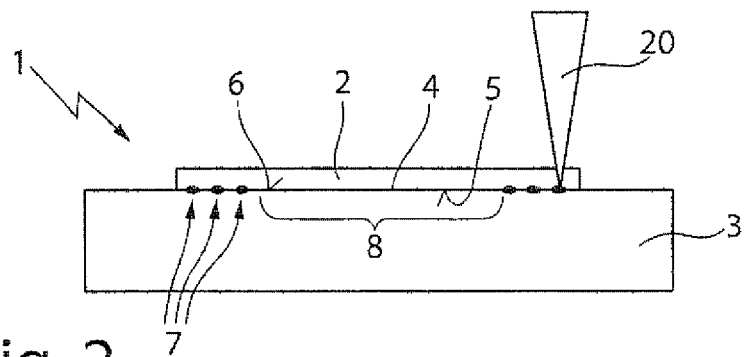
FIG. 2 shows a cross-sectional view of a modified embodiment of the laser system shown in FIG. 1 with additional point-like weld locations between the laser-active body and the heat sink.

In the laser system 1 shown in FIG. 2, the solid 2 and the heat sink 3, as well as being joined by direct bonding, are additionally laser welded with one another via point-like weld locations 7, in order to improve the structural strength of the laser system 1 as a whole. The weld locations 7 are arranged between the solid 2 and the heat sink 3, that is, in the contact plane 4 beneath the solid 2 and above the heat sink 3. Laser welding is carried out by means of ultrashort pulses (USP laser pulses) 20 through the laser-active solid 2 or through the heat sink 3. At least one of the two components is transparent to the laser welding radiation. The weld locations 7 are arranged around a central or inner pumping region 8 of the solid 2 which is pumped during laser operation and is free of weld locations. Alternatively, it is also possible to fix the solid 2 to the heat sink 3 only via the weld locations 7, that is, without direct bonding.

Figure 3:
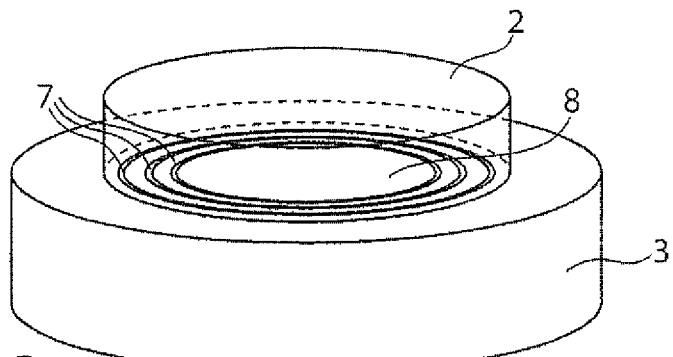
FIG. 3 shows a perspective view of a different modified embodiment of the laser system shown in FIG. 1 with additional annular weld locations between the laser-active body and the heat sink.

The weld locations 7 can also be combined to form a weld ring or, as is shown in FIG. 3, a plurality of mutually concentric weld rings which are arranged annularly around the pumping region of the solid 2. The weld rings accordingly confer upon the laser system 1 a uniform or symmetrical cohesion.

Others than shown in FIGS. 1 to 3, the solid 2 can have coatings on its upper or lower side, the solid contact face 5 in this case being formed by the surface of the coating.

Figure 4:
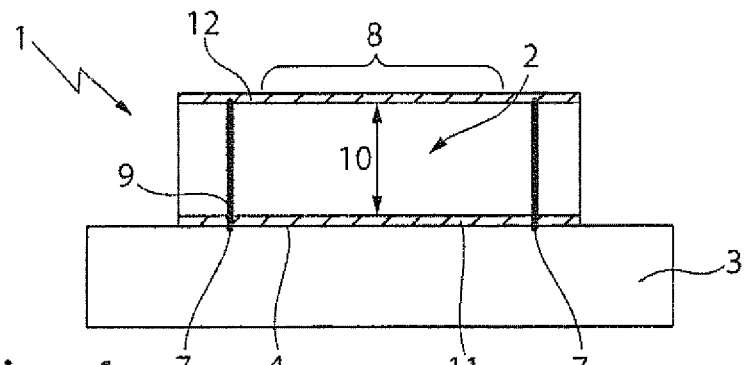
FIG. 4 shows a cross-sectional view of a further embodiment of the laser system according to the invention with weld filaments inside the laser-active body.

In contrast to FIG. 3, the laser system 1 shown in FIG. 4 has a plurality of point-like weld locations 7 arranged along a ring as well as, inside the solid 2, a plurality of weld filaments 9, which are arranged outside the pumping region 8 of the solid 2 and can be combined to form a closed ring. The weld filaments 9, which are introduced or melted into the laser-active body 2 by laser welding radiation, are weld seams or structures with melted or re-melted solid material which have a different refractive index as compared with the remainder of the solid material and act as scatter barriers for amplified spontaneous emission (ASE). Beginning immediately at the weld locations 7 formed between the solid 2 and the heat sink 3, the weld filaments 9 extend in the thickness direction 10 of the solid 2 through a high-reflection coating (HR layer) 11 on its lower side and through the laser-active body 2 to an anti-reflection coating (AR layer) 12 on its upper side.

A number of embodiments of the invention have been described. Nevertheless, it will be understood that various modifications may be made without departing from the spirit and scope of the invention. Accordingly, other embodiments are within the scope of the following claims.

What is claimed is:

1. A laser system comprising:
a laser-active solid; and
a heat sink thermally coupled with the solid,
wherein the solid and the heat sink are joined together by direct laser welding.

2. The laser system of claim 1, wherein at least one of the laser-active solid and the heat sink is transparent to laser welding radiation, and
wherein the solid and the heat sink are laser welded to one another via at least one weld location.

3. The laser system of claim 2, wherein the at least one weld location is arranged outside a pumping region of the solid that is pumped during laser operation.

4. The laser system of claim 3, wherein the at least one weld location is in the form of a closed weld ring arranged around the pumping region of the solid.

5. The laser system of claim 1, wherein the solid and the heat sink are laser welded to one another via a plurality of point-like weld locations or a plurality of nested weld rings.

6. The laser system of claim 5, wherein the solid and the heat sink are laser welded to one another via a plurality of point-like weld locations arranged along a closed perimeter about a pumping region of the solid that is pumped during laser operation.

7. A laser system comprising:
a laser-active solid; and
a heat sink thermally coupled with the solid,
wherein the solid and the heat sink are joined together by at least one of direct bonding and direct laser welding, and
wherein the laser-active solid contains one or more weld filaments introduced into the laser-active solid by laser welding radiation.

8. The laser system of claim 7, wherein the weld filaments extend in a thickness direction of the solid.

9. The laser system of claim 8, wherein the weld filaments extend across the entire thickness of the solid.

10. The laser system of claim 7, wherein the weld filaments are arranged outside a pumping region of the solid that is pumped during laser operation.

11. The laser system of claim 10, wherein the weld filaments are arranged annularly around the pumping region of the solid.

12. The laser system of claim 7, wherein the weld filaments each terminate in a weld location formed between the solid and the heat sink.

13. The laser system of claim 7, wherein the laser-active solid comprises a surface remote from the heat sink and having an anti-reflection coating, and wherein the weld filaments extend into the anti-reflection coating.

14. The laser system of claim 1, wherein the laser-active solid and the heat sink have a disk-like shape.

15. A method of arranging a laser-active solid and a heat sink in a laser system by direct laser welding, the method comprising:
   placing a solid contact face of the laser-active solid in direct contact with a contact face of the heat sink to form a contact plane between the laser-active solid and the heat sink; and
   directing a laser beam through one of the solid and the heat sink onto at least one location in the contact plane to weld the laser-active solid contact face and the heat sink contact face together.

16. The method of claim 15, wherein the one of the solid and the heat sink through which the laser beam is directed is transparent to the laser beam.

17. The method of claim 15, wherein the laser beam is a focused laser beam including ultrashort laser pulses.

18. A method of arranging a laser-active solid and a heat sink in a laser system, the method comprising:
   placing a solid contact face of the laser-active solid in direct contact with a contact face of the heat sink to form a contact plane between the laser-active solid and the heat sink;
   directing a laser beam through one of the solid and the heat sink onto at least one location in the contact plane to weld the laser-active solid contact face and the heat sink contact face together; and
   moving the laser beam from the contact plane towards an upper side of the solid along a thickness direction of the solid to produce at least one weld filament inside the solid.

19. The method of claim 18, wherein moving the laser beam comprises moving the laser beam from a weld location formed at the at least one location through a high-reflection coating on a lower side of the solid and through a laser-active body of the solid to an anti-reflection coating on the upper side of the solid.

20. A method of arranging a laser-active solid and a heat sink in a laser system, the method comprising:
   placing a solid contact face of the laser-active solid in direct contact with a contact face of the heat sink to form a contact plane between the laser-active solid and the heat sink;
   directing a laser beam through one of the solid and the heat sink onto at least one location in the contact plane to weld the laser-active solid contact face and the heat sink contact face together; and
   maintaining the laser beam focused at one location; while adjusting one or more parameters of the laser beam to produce at least one weld filament inside the laser-active solid.

21. The laser system of claim 1, wherein direct laser welding uses laser welding radiation including ultrashort laser pulses.

22. The laser system of claim 1, wherein the solid and the heat sink are joined together by both direct bonding and direct laser welding.

* * * * *